United States Patent
Grossman et al.

(10) Patent No.: US 10,365,070 B2
(45) Date of Patent: Jul. 30, 2019

(54) BALLISTIC RESISTANT ARTICLE WITH NON-UNIFORMLY DISTRIBUTED MATRIX MATERIAL AND METHOD TO MANUFACTURE SAID ARTICLE

(71) Applicants: TEIJIN ARAMID B.V., Arnhem (NL); BARRDAY INC., Cambridge (CA)

(72) Inventors: Jan Grossman, Chapel Hill, NC (US); Marc-Jan De Haas, Apeldoorn (NL); Nektarios Poulopoulos, Petersburg (CA); Alicia Williams, Huntersville, NC (US); Jason Wilson, Huntersville, NC (US)

(73) Assignees: TEIJIN ARAMID B.V., Arnhem (NL); BARRDAY INC., Cambridge (CA)

( * ) Notice: Subject to any disclaimer, the term of this patent is extended or adjusted under 35 U.S.C. 154(b) by 315 days.

(21) Appl. No.: 15/036,273

(22) PCT Filed: Nov. 12, 2014

(86) PCT No.: PCT/EP2014/074307
§ 371 (c)(1),
(2) Date: May 12, 2016

(87) PCT Pub. No.: WO2015/071275
PCT Pub. Date: May 21, 2015

(65) Prior Publication Data
US 2016/0282088 A1    Sep. 29, 2016

(30) Foreign Application Priority Data

Nov. 13, 2013 (EP) ..................... 13192674

(51) Int. Cl.
*F41H 5/04* (2006.01)
*B32B 5/26* (2006.01)
*B32B 7/08* (2019.01)
*B32B 7/12* (2006.01)

(52) U.S. Cl.
CPC ............. *F41H 5/0485* (2013.01); *B32B 5/26* (2013.01); *B32B 7/08* (2013.01); *B32B 7/12* (2013.01); *F41H 5/0471* (2013.01); *B32B 2571/02* (2013.01)

(58) Field of Classification Search
CPC combination set(s) only.
See application file for complete search history.

(56) References Cited

U.S. PATENT DOCUMENTS

| 2009/0297816 A1 | 12/2009 | Arvidson et al. |
| 2012/0244769 A1 | 9/2012 | Ardiff et al. |
| 2013/0295805 A1 | 11/2013 | de Haas et al. |

FOREIGN PATENT DOCUMENTS

| WO | 2008/121677 A1 | 10/2008 |
| WO | 2011/100832 A1 | 8/2011 |

OTHER PUBLICATIONS

Jan. 27, 2015 International Search Report issued in International Patent Application No. PCT/EP2014/074307.
Jan. 27, 2015 Written Opinion of the International Searching Authority issued in International Patent Application No. PCT/EP2014/074307.

*Primary Examiner* — Arti Singh-Pandey
(74) *Attorney, Agent, or Firm* — Oliff PLC

(57) ABSTRACT

A ballistic resistant article includes at least one consolidated composite, wherein the at least one consolidated composite includes a layer A and a layer B bonded to one another. Each, layer A and B exhibits
  a first surface,
  a second surface opposite to the first surface, and
  a cross-section extending from the first surface to the second surface, and includes a network of fibers having a strength of at least 800 mN/tex (1100 MPa), and the fibers in each layer A and B are impregnated with a matrix material. The matrix material is distributed along the cross-section of each layer in a concentration gradient in which the concentration starts with a maximum value on the first surface, decreases along the cross-section and reaches a minimum value on the second surface. The matrix material includes a mixture of a polychloroprene, and a random copolymer of vinyl chloride and an acrylic ester.

18 Claims, No Drawings

BALLISTIC RESISTANT ARTICLE WITH NON-UNIFORMLY DISTRIBUTED MATRIX MATERIAL AND METHOD TO MANUFACTURE SAID ARTICLE

The application pertains to a ballistic resistant article with non-uniformly distributed matrix material and to a method to manufacture said article.

BACKGROUND

US 2012/0244769 A1 states that during fabrication of precursor materials that are subsequently processed into shaped sub-assemblies, composites may be fabricated having resin-rich and resin-poor areas, where resin-rich areas have a greater concentration of polymeric binder material than resin poor areas. Typically, resin-poor areas are found at one or both of the outer surfaces with most of the polymeric binder at the interior of the composite. This results in difficulties in consolidating individual layers into sub-assemblies and/or processing multiple sub-assemblies. To solve the problems associated with a non-uniform distribution of resin, US 2012/0244769 A1 provides a method of producing a composite impregnated with a non-uniformly distributed binder, i.e., matrix material, comprising:
a) providing a fiber layer having an outer top surface and an outer bottom surface, the fiber layer comprising a plurality of fiber plies, each of said fiber plies comprising a plurality of fibers, wherein the fiber layer is impregnated with a polymeric binder material,
b) applying a thermoplastic polymer in the shape of, for example, a scrim or a film onto said outer and/or bottom surface of the fiber layer, and
c) bonding the thermoplastic polymer on the fiber layer to the fiber layer.

So, the resulting composites of US 2012/0244769 A1 exhibit a thermoplastic polymer on their outer and/or bottom surfaces additionally to the polymeric binder material, i.e., additionally to the matrix material, and are useful as ballistic resistant composites. Application of said additional thermoplastic polymer on the outer surface(s) of the composite needs additional process steps in the manufacturing process of the ballistic resistant composites and, therefore increases the effort which is necessary to manufacture a ballistic resistant article comprising said composites. In the event that the thermoplastic polymer film is under-adhered to the outer surface of the composite, the film no longer provides abrasive protection on the outer surface. In the event that the thermoplastic polymer film is over-adhered to the outer surface of the composite, the film can negatively impact the ballistic performance of the composite. The transition between over-adhering and under-adhering occurs within a temperature range of 5° C. and requires precise process control to achieve the desired level of adhesion. However, in the field of ballistic resistant articles there is an everlasting demand for articles that can be manufactured in an easier manner without impairing the ballistic resistance of the article in terms of their $v_{50}$-values.

Therefore, the problem sought to be addressed by the present application is to provide a ballistic resistant article that can be manufactured in an easier manner than known from the cited art, but without impairing the ballistic resistance of the article in terms of its $v_{50}$-values.

SUMMARY

Said problem is solved by a ballistic resistant article comprising at least one consolidated composite, wherein the at least one consolidated composite comprises a layer A and a layer B bonded to one another, wherein each layer A and B exhibits
a first surface,
a second surface opposite to the first surface, and
a cross-section extending from the first surface to the second surface,
each layer A and each layer B comprises a network of fibers having a strength of at least 800 mN/tex (1100 MPa) according to ASTM D 7269-07, and the fibers in each layer A and B are impregnated with a matrix material, characterized in that the matrix material is distributed along the cross-section of each layer in the shape of a concentration gradient, wherein the concentration starts with a maximum value on the first surface, so that the first surface is rich in matrix material, decreases along the cross-section and reaches a minimum value on the second surface, so that the second surface is poor in matrix material, and the matrix material comprises a mixture of 75 to 95 wt. % of a polychloroprene, and 5 to 25 wt. % of a random copolymer of vinyl chloride and an acrylic ester based on a weight of the mixture.

DETAILED DESCRIPTION

Surprisingly, the ballistic resistant article according to the present application though lacking any additional thermoplastic polymer, i.e., for example any thermoplastic scrim or film, on the outer surfaces of its at least one consolidated composite, exhibits at least the same and in most cases even a higher $v_{50}$-value in comparison with a comparative ballistic resistant article of the same areal weight but with an additional thermoplastic layer on its outer surfaces.

Furthermore, the ballistic resistant article according to the present application performed well in the gasoline resistance soak test, wherein the consolidated composites are soaked for 4 hours in gasoline, dried for 30 minutes and inspected. Thereafter, the ballistic resistant article according to the present application did neither exhibit any delamination nor any fiber let-off.

Furthermore, the ballistic resistant article according to the present application looked good after being ballistically tested and tumbled at 5±1 rotations per minute for 10 days in a climate of 65° C. and 80% relative humidity. A comparative ballistic resistant article, which contains a matrix material different from that used in the inventive ballistic article and a film both on its first and second surface, looked worse after the same ballistic and tumbling test.

In a preferred embodiment of the ballistic resistant article according to the present application, the layers A and B were bonded to one another either
i) by binding layer A with its first surface rich in matrix material to the second surface poor in matrix material of layer B, or
ii) by binding layer A with its first surface rich in matrix material to the first surface rich in matrix material of layer B.

Within the scope of the present application, the wording "poor in matrix material" encompasses also "no matrix material".

Furthermore, within the scope of the present application, the phrase "consolidated composite comprises a layer A and a layer B" means that layer A and layer B are necessary to form said composite and that said layer A and said layer B have been stacked on one another and thereafter consolidated, i.e., bonded to one another. Preferably, the consolidated composite consists of layer A and layer B.

The ballistic resistant article according to the present application exhibits the surprising effects described above even in an embodiment, wherein said article comprises only one consolidated composite which comprises only layer A and layer B, wherein the matrix material is distributed along the cross-section of each layer in the shape of a concentration gradient, wherein the concentration starts with a maximum value on the first surface, so that the first surface is rich in matrix material, decreases along the cross-section and reaches a minimum value on the second surface, so that the second surface is poor in matrix material, and the matrix material comprises a mixture of 75 to 95 wt. % polychloroprene, and 5 to 25 wt. % of a random copolymer of vinyl chloride and an acrylic ester based on a weight of the mixture, and wherein the layers A and B are bonded to one another preferably either i) by binding layer A with its first surface rich in matrix material to the second surface poor in matrix material of layer B, or
ii) by binding layer A with its first surface rich in matrix material to the first surface rich in matrix material of layer B.

In a further preferred embodiment of the ballistic resistant article according to the present application, the ballistic resistant article contains 15 wt. % to 20 wt. %, and especially preferred 16 wt. % to 17 wt. %, of the matrix material with respect to the at least one consolidated composite.

The skilled person who knows the present application and who shall provide a ballistic resistant article according to the present application for a desired level of ballistic protection will select an appropriate number of consolidated composites. For frequently desired levels of ballistic protection, said number of consolidated composites preferably ranges from 2 to 100. In a more preferred embodiment of the ballistic resistant article according to the present application, the article comprises, preferably consists of, 2 to 60 consolidated composites. In an especially preferred embodiment of the ballistic article according to the present application, the article comprises, preferably consists of, 5 to 45 consolidated composites.

Within the scope of the present application, the phrase "ballistic resistant article comprising 2 to 100 consolidated composites" means that said 2 to 100 consolidated composites are stacked onto one another and fixated to one another to result in the ballistic resistant article which is stable enough that during handling of the ballistic resistant article its single composites are hindered to slip out of the article. However, to achieve said stability, not any additional thermoplastic polymer on the outer surface(s) of a consolidated composite has been applied.

In a preferred embodiment of the ballistic resistant article according to the present application, the consolidated composites are fixated to one another by stitching or by lamination.

In an especially preferred embodiment of the ballistic resistant article according to the present application, the stitching is located at the corners of the composite.

Within the scope of the present application, the phrase "each layer A and each layer B comprises a network of fibers" means that each layer A and each layer B comprises a textile fabric comprising fibers arranged relative to one another in a certain manner which is characteristic for said textile fabric. Preferably, the fibers are arranged relative to one another
in a woven manner or
in a non-woven manner, like in a felt, but more preferred in a configuration wherein the fibers are unidirectional aligned relative to one another.

Therefore, in a preferred embodiment of the ballistic resistant article according to the present application, the network of fibers comprised by each layer A and B is a woven fabric or a non-woven fabric, and the non-woven fabric preferably is a unidirectional aligned fiber layer.

Within the scope of the present application, the term "fibers" means an elongate body, the length dimension of which is much greater than the transverse dimensions of width and thickness. Accordingly, "fibers" includes filaments, i.e., monofilament fibers, multifilament fibers, ribbons, strips, staple fibers and yarns made from one or more of the foregoing, for example multifilament yarns or staple fiber yarns. Especially preferred "fibers" are multifilament yarns. The cross-sections of the "fibers" to be used in the present application may vary widely. They may be circular, flat or oblong in cross-section. They also may be of irregular or regular shape having one or more regular or irregular lobes projecting from the longitudinal axis of, e.g., a filament. Preferably the "fibers" exhibit a substantially circular cross-section, wherein filaments with a substantially circular cross-section are preferred.

The fibers comprised by the network of fibers have a strength of at least 800 mN/tex (1100 MPa) according to ASTM D 7269-07, and preferably are aramid fibers, especially p-aramid fibers.

Within the scope of the present application, the term "aramid fibers" means fibers produced from an aromatic polyamide as the fiber-forming polymer. In said fiber forming polymer, at least 85% of the amide (—CO—NH—) bonds are directly bound on two aromatic rings. Especially preferred aromatic polyamides are p-aramides. Among the p-aramides, poly(p-phenylene terephthalamide) is the most preferred one. Poly(p-phenylene terephthalamide) results from the mol:mol polymerization of p-phenylene diamine and terephthalic acid dichloride. Fibers consisting, e.g., of multifilament yarns made from poly(p-phenylene terephthalamide) can be obtained under the trade name Twaron® from Teijin Aramid (NL).

In the ballistic resistant article according to the present application, the fibers in each layer A and B are impregnated with a matrix material which comprises a mixture of 75 to 95 wt. % polychloroprene, and 5 to 25 wt. % of a random copolymer of vinyl chloride and an acrylic ester.

If the matrix material comprises less than 75 wt. % of the polychloroprene, and less than 5 to 25 wt. % of the random copolymer of vinyl chloride and an acrylic ester, sufficient ply adhesion during consolidation cannot be achieved. Also, structural performance after ballistic testing or after tumbling is then not on a sufficient level.

If the matrix material comprises more than 95 wt. % of the polychloroprene, and less than 5 wt. % of the random copolymer of vinyl chloride and an acrylic ester, the ballistic performance drops below the required level.

In an especially preferred embodiment of the ballistic article according to the present application, the matrix material comprises a mixture of 88 to 92 wt. % polychloroprene, and 8 to 12 wt. % of a random copolymer of vinyl chloride and an acrylic ester.

Within the scope of the present application, the term "random copolymer of vinyl chloride and an acrylic ester" means a copolymer wherein the monomers vinyl chloride and the acrylic ester are copolymerized via their double bonds in a random sequence, and wherein the acrylic ester is an ester of acrylic acid.

In a preferred embodiment, said ester of acrylic acid is an alkyl ester of acrylic acid, wherein the alkyl group has the structural formula $C_nH_{2n+1}$, wherein n is an integer from 1 to 8. Especially preferred acrylic esters are methyl acrylate, ethyl acrylate, propyl acrylate, n-butyl acrylate, iso-butyl acrylate, pentyl acrylate, n-hexyl acrylate, n-heptyl acrylate, and n-octyl acrylate.

In a preferred embodiment of the ballistic resistant article according to the present application, the matrix material comprises a tackifier additionally to the polychloroprene and the random copolymer of vinyl chloride and an acrylic ester.

Within the scope of the present application the term "tackifier" means a chemical compound preferably present in the matrix material of the ballistic resistant article according to the present application and being homogenously distributed in said matrix material, thereby providing the matrix material with additional tack. And within the scope of the present application the term "homogeneously distributed in said matrix material" means that the concentration of the tackifier in every volume element of the matrix material is the same.

In a preferred embodiment of the ballistic article according to the present application, the tackifier is selected from the group consisting of
- rosin resins which are derived from either tree stumps (wood resin), sap (gum rosin) or by-products of the paper making process (tall oil rosin), wherein the rosin resins may be
- rosin esters obtained by the reaction between rosin acids and alcohols,
- hydrogenated rosin esters obtained by hydrogenation of the rosin acid raw material or
- dimerized rosin resins obtained from dimerizing rosin acids or
- terpene resins derived from terpene feedstocks either from wood sources or from citrus fruit, or
- hydrocarbon resins available from Neville Chemical Company, US under several designations, such as NP-10, NP-25 and FN-175.

In a preferred embodiment of the ballistic article according to the present application, the matrix material comprises a mixture of 55 to 96 wt. % polychloroprene, 5 to 25 wt. % of a random copolymer of vinyl chloride and an acrylic ester, and 1 to 20 wt. % of a tackifier.

If the concentration of the tackifier in the matrix material is less than 1 wt. %, sufficient ply adhesion during consolidation may not be achieved. Also, structural performance after ballistic testing or after tumbling may not be on a sufficient level. If the concentration of the tackifier in the matrix material is more than 20 wt. %, the ballistic performance may drop below the required level.

In a preferred embodiment of the ballistic article of the present application, the tackifier is selected from the group consisting of terpene resins derived from terpene feedstocks either from wood sources or citrus fruit, wherein a thermoplastic terpene-phenolic resin is especially preferred for the tackifier.

The polychloroprene comprised by the matrix material is a synthetic rubber made by polymerization of 2-chloro-1,3-butadiene.

In a preferred embodiment of the ballistic article of the present application, the polychloroprene exhibits a glass transition temperature $T_g$ in the range from −60 to −20° C., especially preferred in the range from −50 to −30° C.

In a further preferred embodiment of the ballistic article of the present application, the polychloroprene which was used to prepare the mixture which the matrix material comprises is applied as a dispersion which exhibits a viscosity measured according to ISO 1652 in the range from 50 to 500 mPa·s, especially preferred in the range from 200 to 400 mPa·s.

In a preferred embodiment of the ballistic article of the present application, an areal density of each consolidated cross-ply comprised by said article ranges from 50 $g/m^2$ to 200 $g/m^2$, preferably from 80 $g/m^2$ to 150 $g/m^2$.

The ballistic article of the present application is manufactured by a process, wherein the process comprises the following steps:
a) manufacturing at least one consolidated composite which comprises, preferably consists of, a layer A and a layer B, wherein each layer A and B exhibits
  a first surface,
  a second surface opposite to the first surface, and
  a cross-section extending from the first surface to the second surface,
  each layer A and each layer B comprises a network of fibers,
  the fibers having a strength of at least 800 mN/tex (1100 MPa) according to ASTM D 7269-07, by
  a1) impregnating layer A with a matrix material by distributing the matrix material along the cross-section of layer A in the shape of a concentration gradient, wherein the concentration starts with a maximum value on the first surface, so that the first surface is rich in matrix material, decreases along the cross-section and reaches a minimum value on the second surface, so that the second surface is poor in matrix material, wherein the matrix material comprises a mixture of 75 to 95 wt. % of a polychloroprene, and 5 to 25 wt. % of a random copolymer of vinyl chloride and an acrylic ester, based on a weight of the mixture,
  a2) impregnating layer B with a matrix material by distributing the matrix material along the cross-section of layer B in the shape of a concentration gradient, wherein the concentration starts with a maximum value on the first surface, so that the first surface is rich in matrix material, decreases along the cross-section and reaches a minimum value on the second surface, so that the second surface is poor in matrix material, wherein the matrix material comprises a mixture of 75 to 95 wt. % of a polychloroprene, and 5 to 25 wt. % of a random copolymer of vinyl chloride and an acrylic ester, based on a weight of the mixture, and
  a3) binding the layers A and B to one another
  and, if two or more consolidated composites are manufactured in step a)
b) stacking the two or more consolidated composites obtained in step a3).

It is also possible to combine four layers A,B,A,B to a 4-layer laminate. For the ballistic properties of such laminates, it is of advantage if the adhesion between layer B of the first unit (A,B) and layer A of the second unit (A,B) is lower than the adhesion between the layers A and B within one unit.

To create the 4 ply laminate described above where the NB bond in a unit, e.g., the 0°/90° bond between cross-plied unidirectional layers is created with resin rich to resin poor surface, it is necessary to process the AB units individually at elevated temperature and/or pressure to create a higher adhesive bond between the A and B layers and then to laminate the AB units together at lower temperature and/or pressure to ensure that the adhesion between AB units is lower than the adhesion within the individual AB units.

When creating a 4 ply laminate where the AB bond in a unit is created with resin rich to resin rich surfaces in the AB unit, it is not necessary to use two processing steps to have a weaker bond between the AB units as the interface is resin poor to resin poor and the adhesion will naturally be lower, thereby making the manufacturing process simpler and more cost effective.

The method according to the present application does not require any process steps to apply a thermoplastic polymer on the outer surface(s) of the at least one consolidated composite and therefore, is significantly easier to be performed than the consolidated composite described in US 2012/0244769 A1. Nevertheless, the ballistic resistant article resulting from said method exhibits the already described advantageous properties regarding its $v_{50}$-value, its behavior in the gasoline soak test, and its appearance after being ballistically tested and after tumbling.

In a preferred embodiment of the method according to the present application, the step a3) of binding the layers A and B to one another is performed either
i) by binding layer A with its first surface rich in matrix material to the second surface poor in matrix material of layer B, or
ii) by binding layer A with its first surface rich in matrix material to the first surface rich in matrix material of layer B.

The binding, i.e., the consolidating of layer A with layer B, may be performed in the present application by pressing layer A and layer B at a relative low pressure to one another. Said pressure may be around 1.1 bar, for example in the range of 0.5 to 1.5 bar. Preferably, layers A and B are preheated before being pressed to one another.

For the manufacture of ballistic resistant articles comprising polychloroprene as the matrix material, higher pressures are generally applied. These may range from 3 to 20 bar.

In a preferred embodiment of the method according to the present application, in step b) the stacked two or more consolidated composites are fixated with one another by stitching them.

In an especially preferred embodiment of the method according to the present application, stitching is performed at the corners of the composites.

It is also possible to stack two consolidated composites and form a 4-layer laminate by applying heat and pressure.

The application will be described in more detail in the following examples and comparative example.

COMPARATIVE EXAMPLE a) Manufacture of a Single Unidirectional Fibrous Layer (1L-UD)

Poly(p-phenylene terephthalamide) multifilament yarns (Twaron® type 2000; 1100 dtex f1000; Manufacturer: Teijin Aramid, NL) were taken from a creel and passed through a reed thus aligned substantially parallel to one another. The substantially parallel yarns were dipped in a bath containing a resin emulsion. The resin emulsion consisted of an aqueous styrene-isoprene-styrene block-copolymer dispersion, containing abietic acid as a tackifier (Prinlin® B7137 HV; glass transition temperature $T_g$=−40 to −50° C., Manufacturer: Henkel, Germany). After leaving the bath, the dipped yarns were passed through nip rollers and spread. The spread yarns coated with the emulsion were laid up on a silicone coated release liner and then dried using an oven set at 100° C. for 2 to 4 minutes resulting in a single unidirectional fabric layer (1L-UD).

The resin concentration in the 1L-UD was 16±1 wt. % based on the total weight of the 1L-UD, i.e., with respect to the weight of yarn+matrix without moisture, i.e., the weight of the 1L-UD dried to a water content of practically 0 wt. %, that means a water content of well below 0.5 wt. %. From a practical point of view this means drying to a water content of zero wt. %. The areal density of the poly(p-phenylene terephthalamide) multifilament yarns in the 1L-UD was 45±5 g/m². The total areal density including equilibrium moisture content of the 1L-UD was 54±5 g/m², wherein said ±5 g/m² variation results from unavoidable variations in the coating operation+variations in the humidity, wherein the 1L-UD is stored. In the 1L-UD the Prinlin™ B7137 HV matrix material is distributed along the cross-section of the 1L-UD in the shape of a concentration gradient, wherein the concentration starts with a maximum value on one surface of the 1L-UD, so that said surface is rich in matrix material, decreases along the cross-section and reaches a minimum value on the other surface of the 1L-UD, so that said other surface is poor in matrix material.

b) Manufacture of a Consolidated Cross-Ply (2L-UD) from Two 1L-UDs

A consolidated two-layer UD made from two one-layer UDs as described in a) above, each showing a concentration gradient, can be made by combining the two one-layer UDs either by cross-plying in such a manner that the surface of the one-layer UD which is poor in matrix material faces the surface of the other one-layer UD which is rich in matrix material or alternatively, that the surface of the one-layer UD which is rich in matrix material faces the surface of the other one-layer UD which is rich in matrix material.

Here two 1L-UDs resulting from a) were cross-plied at cross-plying angle of 90°±5° in such a manner that the surface of one of the 1L-UD which is poor in matrix material was cross-plied onto the surface of the other 1L-UD which is rich in matrix material. The cross-plied 1L-UDs were consolidated in a cross-plying unit using a three step process. In the first step, the cross-plied 1L-UDs were heated for 5 to 15 seconds in close contact with a 92.5° C. hot platen without applying any pressure. Then a pressure of around 1.1 bar was applied for 5 to 15 seconds and finally cooling to room temperature by ambient air resulted in a 2L-UD exhibiting one outer surface which is rich in matrix material and another other surface which is poor in matrix material. In this manner, two 2L-UD cross-plies were manufactured.

c) Manufacture of a LDPE Film Coated 4L-UD from Two 2L-UDs

The two 2L-UDs resulting from b) were cross-plied at a cross-plying angle of 90° in such a manner that the surface which is poor in matrix material of one 2L-UD was cross-plied onto the surface which is rich in matrix material of the other 2L-UD to yield a stack with a 0°/90°/0°/90° cross-plying angle sequence. Said stack was provided with a 6 μm thick LDPE film on its top surface and with a 6 μm thick LDPE film on its bottom surface. The stack provided with said two LDPE films was laminated by guiding it through a Reliant flat belt laminator having a heating-zone followed by a pressing-zone and a cooling zone. The resulting is an LDPE film coated 4L-UD having an areal density of 238 g/m².

d) Manufacture of Ballistic Test Panels and Ballistic Evaluation 15 film-coated 4L-UD cross-plies obtained from c) were stacked in such a way that always a 0° oriented ply was adjacent to a 90° oriented ply. Then said stacked 15 film-coated 4L-UD cross-plies were fixated by stitching them at the corners. In said manner, 3 test panels were manufactured.

These test panels had an areal density of 3570 g/m² each. Said test panels were evaluated according MIL STD 662F with respect to its $v_{50}$-value obtained with bullets of ammunition type 0.357 Mag Remington. The average $v_{50}$-value is shown in table 1 together with its standard deviation.

In the same manner as described above, 3 test panels were manufactured, however with the difference that the test panels contained 25 film-coated 4L-UD cross-plies. The test panels had an areal density of 5950 g/m². Said test panels were evaluated according MIL STD 662F with respect to the $v_{50}$-value obtained with bullets of ammunition type 0.44 Mag Speer. The average $v_{50}$-value is shown in table 1 together with its standard deviation.

In the same manner as described above, 3 test panels were manufactured, however with the difference that each test panel contained 16 film-coated 4L-UD cross-plies. These test panels had an areal density of about 3808 g/m² each. Said test panels were evaluated according MIL STD 662F with respect to the $v_{50}$-value obtained with bullets (ammunition type: 9 mm Remington, 0° obliquity). The average $v_{50}$-value is shown in table 1 together with its standard deviation.

EXAMPLE 1 a) Manufacture of a Single Unidirectional Fibrous Layer (1L-UD), i.e. Layer A

Poly(p-phenylene terephthalamide) multifilament yarns (Twaron® type 2000; 1100 dtex f1000; Manufacturer: Teijin Aramid, NL) were taken from a creel and passed through a reed thus aligned substantially parallel to one another. The substantially parallel yarns were dipped in a bath containing an aqueous matrix dispersion consisting of the components:
a) 75 wt. % Lipren MKB (a colloidal dispersion of polychloroprene, pH=12, solid content 58%, viscosity <120 mPa·s, $T_g$=−40° C., obtained from Synthomer),
b) 20 wt. % Vycar 352 (an anionic emulsion of a random copolymer of vinyl chloride and acrylic ester, pH=10.5, solid content 57.5%, $T_g$=+69° C., Brookfield LVF viscosity (spindle No. 1, 60 rpm)=25 centipoises, obtained from Lubrizol, Advanced Materials Inc.), and
c) 5 wt. % HRJ-11112 (Thermoplastic Terpene Phenolic Tackifier Obtained from SI Group).

Said emulsion was prepared by mixing component a) slowly while adding component b). Once components a) and b) are mixed, component c) is added under agitation.

After leaving the bath, the dipped yarns were passed through nip rollers and spread. The spread yarns coated with the emulsion were laid up on a silicone coated release liner and then dried using an oven set at 100° C. for 2 to 4 minutes, resulting in a single unidirectional fabric layer (1L-UD).

The resin concentration in the 1L-UD was 16±1 wt. % based on the total weight of the 1L-UD, i.e., with respect to the weight of yarn+matrix without moisture, i.e., the weight of the 1L-UD dried to a water content of practically 0 wt. %, that means a water content of well below 0.5 wt. %. From a practical point of view, this means drying to a water content of zero wt. %. The areal density of the poly(p-phenylene terephthalamide) multifilament yarns in the 1L-UD was 45±5 g/m². The total areal density including equilibrium moisture content of the 1L-UD was 54±5 g/m², wherein said ±5 g/m² variation results from unavoidable variations in the coating operation+variations in the humidity, wherein the 1L-UD is stored. In layer A, the matrix material is distributed along its cross-section in the shape of a concentration gradient, wherein the concentration starts with a maximum value on one surface of layer A, so that said surface is rich in matrix material, decreases along the cross-section and reaches a minimum value on the other surface of layer A, so that said other surface is poor in matrix material.

In the same manner another 1L-UD, i.e., layer B, was manufactured.

b) Manufacture of a Consolidated Cross-Ply (2L-UD) from Two 1L-UDs

Layers A and B resulting from a) were cross-plied at cross-plying angle of 90°±5° in such a manner that the surface of layer A which is poor in matrix material was cross-plied onto that surface of layer B which is rich in matrix material. The cross-plied 1L-UDs were consolidated in a cross-plying unit using a three step process. In the first step, the cross-plied 1L-UDs were heated for 5 to 15 seconds in close contact with a 92.5° C. hot platen without applying any pressure. Then a pressure of around 1.1 bar was applied for 5 to 15 seconds and finally cooling to room temperature by ambient air, resulting in a 2L-UD exhibiting one outer surface which is rich in matrix material and another other surface which is poor in matrix material. In the same manner further 2L-UD cross-plies was manufactured.

c) Manufacture of Ballistic Test Panels and Ballistic Evaluation 32 2L-UD cross-plies obtained from b) were stacked in such a way that an outer surface of a 2L-UD cross-ply which is poor in matrix material is laid on the surface of another 2L-UD which is rich in matrix material. This resulted in a stack having one outer surface which is rich in matrix material and another outer surface which is poor in matrix material. Then said stacked 32 2L-UD cross-plies were fixated by stitching them at the corners. In said manner, 2 test panels were manufactured. The test panels had an areal density of 3456 g/m² each. Said test panels were evaluated according MIL STD 662F with respect to their $v_{50}$-value obtained with bullets of ammunition type 0.357 Mag Remington. The bullets were fired on the outer surface of the panel which is poor in matrix material. The average $v_{50}$-value is shown in table 1 together with its standard deviation.

In the same manner as described above, 1 test panel was manufactured, however with the difference that this test panel contained 52 2L-UD cross-plies. Said test panel had an areal density of 5616 g/m². Said test panel was evaluated according MIL STD 662F with respect to its $v_{50}$-value obtained with bullets of ammunition type 0.44 Mag Speer. The bullets were fired on the outer surface of the panel which is poor in matrix material. The $v_{50}$-value is shown in table 1.

In the same manner as described above, 2 test panels were manufactured however with the difference that the test panels contained 33 2L-UD cross-plies. The test panels had an areal density of about 3564 g/m² each. Said test panels were evaluated according MIL STD 662F with respect to the $v_{50}$-value obtained with bullets (ammunition type: 9 mm Remington, 0° obliquity). The bullets were fired on the outer surface of the panel which is poor in matrix material. The average $v_{50}$-value is shown in table 1 together with its standard deviation.

EXAMPLE 2 a) Manufacture of a Single Unidirectional Fibrous Layer (1L-UD), i.e. Layer A

Poly(p-phenylene terephthalamide) multifilament yarns (Twaron® type 2000; 1100 dtex f1000; Manufacturer: Teijin Aramid, NL) were taken from a creel and passed through a reed thus aligned substantially parallel to one another. The substantially parallel yarns were dipped in a bath containing an aqueous matrix dispersion consisting of the components:
a) 75 wt. % Lipren MKB (a colloidal dispersion of polychloroprene, pH=12, solid content 58%, viscosity <120 mPa·s, $T_g$=−40° C., obtained from Synthomer),
b) 20 wt. % Vycar 352 (an anionic emulsion of a random copolymer of vinyl chloride and an acrylic ester), pH=10.5, solid content 57.5%, $T_g$=+69° C., Brookfield LVF viscosity (spindle No. 1, 60 rpm)=25 centipoises, obtained from Lubrizol, Advanced Materials Inc., and
c) 5 wt. % HRJ-11112 (Thermoplastic Terpene Phenolic Tackifier Obtained from SI Group)

Said emulsion was prepared as described in example 1.

After leaving the bath, the dipped yarns were passed through nip rollers and spread. The spread yarns coated with the emulsion were laid up on a silicone coated release liner and then dried using an oven set at 100° C. for 2 to 4 minutes resulting in a single unidirectional fabric layer (1L-UD).

The matrix material concentration in layer A was 16.0±1 wt.-% based on the total weight of layer A, i.e., with respect to the weight of the yarn and the matrix material without moisture, i.e., the weight of layer A dried to a water content of well below 0.5 wt. %. From a practical point of view, this means drying to a water content of zero wt. %. The areal density of the poly(p-phenylene terephthalamide) multifilament yarns in layer A was 45±5 g/m². The total areal density of layer A including equilibrium moisture content of the 1L-UD was 54±5 g/m², wherein said ±5 g/m² variation results from unavoidable variations in the coating operation+variations in the humidity, wherein layer A is stored. In layer A, the matrix material is distributed along its cross-section in the shape of a concentration gradient, wherein the concentration starts with a maximum value on one surface of layer A, so that said surface is rich in matrix material, decreases along the cross-section and reaches a minimum value on the other surface of layer A, so that said other surface is poor in matrix material.

In the same manner another 1L-UD, i.e., layer B, was manufactured.

b) Manufacture of a Consolidated Cross-Ply (2L-UD) from Two 1L-UDs

Layers A and B resulting from a) were cross-plied at cross-plying angle of 90°±5° in such a manner that the surface of layer A, which is rich in matrix material, was cross-plied onto that surface of layer B, which is rich in matrix material. The cross-plied 1L-UDs were consolidated in a cross-plying unit using a three step process. In the first step, the cross-plied 1L-UDs were heated for 5 to 15 seconds in close contact with a 92.5° C. hot platen without applying any pressure. Then a pressure of around 1.1 bar was applied for 5 to 15 seconds and finally cooling to room temperature by ambient air, resulting in a 2L-UD exhibiting one outer surface which is poor in matrix material and another surface which is poor in matrix material. In the same manner further 2L-UD cross-plies were manufactured.

c) Manufacture of Ballistic Test Panels and Ballistic Evaluation 32 2L-UD cross-plies obtained from b) were stacked in such a way that an outer surface of a 2L-UD cross-ply which is poor in matrix material is laid on the surface which is poor in matrix material of another 2L-UD. This resulted in a stack having two outer surfaces which both are poor in matrix material. Then said stacked 32 2L-UD cross-plies were fixated by stitching them at the corners. In said manner, 2 test panels were manufactured. The test panels had an areal density of 3456 g/m² each. Said test panels were evaluated according MIL STD 662F with respect to its $v_{50}$-value obtained with bullets of ammunition type 0.357 Mag Remington. The average $v_{50}$-value is shown in table 1 together with its standard deviation.

In the same manner as described above, 1 test panel was manufactured, however with the difference that said test panel contained 52 2L-UD cross-plies. Said test panel had an areal density of 5616 g/m² each. Said test panel was evaluated according MIL STD 662F with respect to its $v_{50}$-value obtained with bullets of ammunition type 0.44 Mag Speer. The bullets were fired on the outer surface of the panel which is poor in matrix material. The $v_{50}$-value is shown in table 1.

In the same manner as described above, 1 test panel was manufactured, however with the difference that said test panel contained 33 2L-UD cross-plies. This test panel had an areal density of 3564 g/m². Said test panel was evaluated according MIL STD 662F with respect to its $v_{50}$-value obtained with bullets (ammunition type: 9 mm Remington, 0° obliquity). The bullets were fired on the outer surface of the panel which is poor in matrix material. The $v_{50}$-value is shown in table 1.

EXAMPLE 3

Example 3 is performed as example 2 with the only difference that in step a) the aqueous matrix dispersion consists of the components:
a) 85 wt. % Lipren MKB (a colloidal dispersion of polychloroprene, pH=12, solid content 58%, viscosity <120 mPa·s, $T_g$=−40° C., obtained from Synthomer),
b) 10 wt. % Vycar 352 (an anionic emulsion of a random copolymer of vinyl chloride and an acrylic ester, pH=10.5, solid content 57.5%, $T_g$=+69° C., Brookfield LVF viscosity (spindle No. 1, 60 rpm)=25 centipoises, obtained from Lubrizol, Advanced Materials Inc.), and
c) 5 wt. % HRJ-11112 (thermoplastic terpene phenolic tackifier obtained from SI Group)

The results are summarized in table 1, wherein the average $v_{50}$-values are given with their standard deviation if more than one panel has been tested.

TABLE 1

| | $V_{50}$ [m/s] .357 Mag Remington {areal panel weight} [g/m²] | $V_{50}$ [m/s] .44 Mag Speer {areal panel weight} [g/m²] | $V_{50}$ [m/s] 9 mm Remington {areal panel weight} [g/m²] |
|---|---|---|---|
| Comparative example | 461 ± 1.2 {3570} | 507 ± 10 {5950} | 488 ± 9 {3808} |
| example 1 | 465 ± 9.9 {3456} | 518 {5616} | 467 ± 2 {3564} |
| Example 2 | 476 ± 9 {3456} | 519 {5616} | 495 {3564} |
| Example 3 | 464 ± 19 {3456} | 522 ± 2 {5616} | 499 {3564} |

0.357 Mag Remington: Comparison of comparative example 1 with
  example 1 shows that the inventive panel exhibits a $v_{50}$-value which is 1% higher though its areal panel weight is 3% lower,
  example 2 shows that the inventive panel exhibits a $v_{50}$-value which is 3% higher though its areal panel weight is 3% lower, example 3 shows that the inventive panel exhibits a $v_{50}$-value which is 1% higher though its areal panel weight is 3% lower.

0.44 Mag Speer: Comparison of comparative example 1 with example 1 shows that the inventive panel exhibits a $v_{50}$-value which is 2% higher though its areal panel weight is 6% lower, example 2 shows that the inventive panel exhibits a $v_{50}$-value which is 2% higher though its areal panel weight is 6% lower, example 3 shows that the inventive panel exhibits a $v_{50}$-value which is 3% higher though its areal panel weight is 6% lower.

9 mm Remington: Comparison of comparative example 1 with example 1 shows that the inventive panel exhibits a $v_{50}$-value which is 4% lower but its areal panel weight is 6% lower, so that at the same areal panel weight its $v_{50}$-value would be practically the same as that of the comparative panel, example 2 shows that the inventive panel exhibits a $v_{50}$-value which is 1% higher though its areal panel weight is 6% lower, example 3 shows that the inventive panel exhibits a $v_{50}$-value which is 2% higher though its areal panel weight is 6% lower.

The above results demonstrate that the inventive panels compared to a comparative panel with the same areal panel weight exhibit at least the same and in most cases even a higher $v_{50}$-value.

Furthermore, the inventive panels performed well in the gasoline resistance soak test. In this test, the consolidated composites are soaked for 4 hours in gasoline, dried for 30 minutes and inspected and did not exhibited any delamination or any fiber let-off.

Furthermore, the inventive panels looked good after tumbled at 5±1 rotations per minute for 10 days in a climate of 65° C. and 80% relative humidity and being balistically tested. The comparative panels looked worse after the same tumbling test followed by ballistic testing.

Finally, the manufacture of the inventive panels does not require any film lamination steps, and therefore, is significantly easier to be performed than the manufacture of the comparative panels.

The invention claimed is:

1. A ballistic resistant article comprising at least one consolidated composite,
    wherein the at least one consolidated composite comprises a layer A and a layer B bonded to one another, each layer A and each layer B having
    a first surface,
    a second surface opposite to the first surface, and
    a cross-section extending from the first surface to the second surface,
    and each layer A and each layer B comprises a network of fibers having a strength of at least 800 mN/tex (1100 MPa) according to ASTM D 7269-07, and the fibers in each layer A and each layer B are impregnated with a matrix material,
        wherein the matrix material is distributed along the cross-section of each layer in a concentration gradient in which the concentration starts with a maximum value on the first surface, so that the first surface is rich in matrix material, decreases along the cross-section and reaches a minimum value on the second surface, so that the second surface is poor in matrix material, and the matrix material comprises a mixture of 75 to 95 wt. % of a polychloroprene, and 5 to 25 wt. % of a random copolymer of vinyl chloride and an acrylic ester, based on a weight of the mixture.

2. The ballistic resistant article according to claim 1, wherein the layers A and B were bonded to one another either
    i) by binding layer A with its first surface rich in matrix material to the second surface poor in matrix material of layer B, or
    ii) by binding layer A with its first surface rich in matrix material to the first surface rich in matrix material of layer B.

3. The ballistic resistant article according to claim 1, wherein the article comprises 2 to 100 of the consolidated composites.

4. The ballistic resistant article according to claim 3, wherein the consolidated composites are fixated to one another by stitching or by lamination.

5. The ballistic resistant article according to claim 4, wherein the stitching is located at the corners of the composites.

6. The ballistic resistant article according to claim 1, wherein the network of fibers of each layer A and each layer B is a woven fabric or a non-woven fabric.

7. The ballistic resistant article according to claim 6, wherein the non-woven fabric is a unidirectional aligned fiber layer.

8. The ballistic resistant article according to claim 1, wherein the fibers are aramid fibers.

9. The ballistic resistant article according to claim 1, wherein the matrix material comprises a mixture of 88 to 92 wt. % polychloroprene, and 8 to 12 wt. % of a random copolymer of vinyl chloride and an acrylic ester.

10. The ballistic resistant article according to claim 1, wherein the matrix material further comprises 1 to 20 wt. % of a tackifier.

11. The ballistic resistant article according to claim 10, wherein the tackifier is selected from the group consisting of terpene resins derived from terpene feedstocks either from wood sources or from citrus fruit.

12. The ballistic resistant article according to claim 1, wherein the polychloroprene exhibits a glass transition temperature $T_g$ in the range from −60 to −20° C.

13. The ballistic resistant article according to claim 1, wherein an areal density of each consolidated composite ranges from 50 g/m² to 200 g/m².

14. Process to manufacture a ballistic resistant article according to claim 1, wherein the process comprises the following steps:
    a) manufacturing at least one consolidated composite which comprises
        a layer A and a layer B, wherein each layer A and each layer B has
        a first surface,
        a second surface opposite to the first surface, and
        a cross-section extending from the first surface to the second surface,
    each layer A and each layer B comprises a network of fibers, the fibers having a strength of at least 800 mN/tex (1100 MPa) according to ASTM D 7269-07, by
    a1) impregnating layer A with a matrix material by distributing the matrix material along the cross-section of layer A in a concentration gradient in which the concentration starts with a maximum value on the first surface, so that the first surface is rich in matrix material, decreases along the cross-section and reaches a minimum value on the second surface, so that the second surface is poor in matrix material, wherein the matrix material comprises a mixture of 75 to 95 wt. % of a polychloroprene, and 5 to 25 wt. % of a random copolymer of vinyl chloride and an acrylic ester, based on a weight of the mixture, a2) impregnating layer B with a matrix material by distributing the matrix material along the cross-section of layer B in a concentration gradient in which the concentration starts with a maximum value on the first surface, so that the first surface is rich in matrix material, decreases along the cross-section and reaches a minimum value on the second surface, so that the second surface is poor in matrix material, wherein the matrix material comprises a mixture of 75 to 95 wt. % of a polychloroprene, and 5 to 25 wt. % of a random copolymer of vinyl chloride and an acrylic ester, based on a weight of the mixture, and a3) binding the layers A and B to one another, and, if two or more consolidated composites are manufactured in step a), b) stacking the two or more consolidated composites obtained in step a3).

15. Process according to claim 14, wherein the step a3) of binding the layers A
and B to one another is performed either
  i) by binding layer A with its first surface rich in matrix material to the second surface poor in matrix material of layer B, or
  ii) by binding layer A with its first surface rich in matrix material to the first surface rich in matrix material of layer B.

16. Process according to claim 14, wherein in step b) the stacked two or more consolidated composites are fixated with one another by stitching them.

17. Process according to claim 16, wherein stitching is performed at the corners of the composites.

18. A ballistic resistant article comprising at least one consolidated composite, wherein the at least one consolidated composite comprises a layer A and a layer B bonded to one another, each layer A and each layer B having
  a first surface,
  a second surface opposite to the first surface, and
  a cross-section extending from the first surface to the second surface,
and each layer A and each layer B comprises a network of fibers having a strength of at least 800 mN/tex (1100 MPa) according to ASTM D 7269-07, and the fibers in each layer A and each layer B are impregnated with a matrix material,
  wherein the matrix material is distributed along the cross-section of each layer in a concentration gradient in which the concentration starts with a maximum value on the first surface, so that the first surface is rich in matrix material, decreases along the cross-section and reaches a minimum value on the second surface, so that the second surface is poor in matrix material,
  wherein the matrix material comprises a mixture of 75 to 95 wt. % of a polychloroprene, and 5 to 25 wt. % of a random copolymer of vinyl chloride and an acrylic ester, based on a weight of the mixture, and
  wherein the ballistic resistant article is made by a process comprising:
  a) manufacturing the at least one consolidated composite by
    a1) impregnating layer A with the matrix material by distributing the matrix material along the cross-section of layer A in the concentration gradient,
    a2) impregnating layer B with the matrix material by distributing the matrix material along the cross-section of layer B in the concentration gradient, and
    a3) binding the layers A and B to one another,
and, if two or more of the consolidated composites are manufactured in step a),
  b) stacking the two or more consolidated composites.

* * * * *

UNITED STATES PATENT AND TRADEMARK OFFICE
CERTIFICATE OF CORRECTION

Page 1 of 1

PATENT NO. : 10,365,070 B2
APPLICATION NO. : 15/036273
DATED : July 30, 2019
INVENTOR(S) : Jan Grossman et al.

It is certified that error appears in the above-identified patent and that said Letters Patent is hereby corrected as shown below:

On the Title Page

Item [30], "(EP) 13192674" should read ---(EP) 13192674.3---.

In the Specification

Column 6, Line 60, "NB bond" should read ---A/B bond---.

Column 7, Line 61, "$T_9$" should read ---$T_g$---.

Signed and Sealed this
First Day of October, 2019

Andrei Iancu
*Director of the United States Patent and Trademark Office*